US008277917B2

(12) United States Patent
Neto et al.

(10) Patent No.: US 8,277,917 B2
(45) Date of Patent: Oct. 2, 2012

(54) ROLLS OF MATERIAL PROVIDING ONE-HANDED DISPENSING OF SHEETS OF PRE-DETERMINED LENGTH

(75) Inventors: Tsutama Satake Neto, Mogi das Cruzes-Sao Paulo (BR); Jose Lee McIntyre, Santana (CR); James Leo Baggot, Menasha, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 13/075,606

(22) Filed: Mar. 30, 2011

(65) Prior Publication Data

US 2011/0177278 A1 Jul. 21, 2011

Related U.S. Application Data

(62) Division of application No. 12/001,966, filed on Dec. 13, 2007, now abandoned.

(51) Int. Cl.
*A47K 10/16* (2006.01)
*B65H 18/28* (2006.01)
*B32B 29/00* (2006.01)

(52) U.S. Cl. .......... 428/43; 2/49.1; 242/159; 242/160.1; 428/212; 428/220

(58) Field of Classification Search .................... 428/43, 428/220, 212; 242/160.1, 159; 2/49.1
See application file for complete search history.

(56) References Cited

U.S. PATENT DOCUMENTS

| | | | | |
|---|---|---|---|---|
| 459,516 A | | 9/1891 | Wheeler | |
| 2,050,394 A | | 8/1936 | Straubel | |
| 4,963,406 A | * | 10/1990 | Gooding et al. | 428/43 |
| 5,248,106 A | | 9/1993 | Biagiotti | |
| 5,363,728 A | | 11/1994 | Elsner et al. | |
| 5,407,718 A | * | 4/1995 | Popat et al. | 428/41.5 |
| 5,562,964 A | | 10/1996 | Jones | |
| 5,609,269 A | | 3/1997 | Behnke et al. | |
| 5,704,566 A | | 1/1998 | Schutz et al. | |
| 5,763,038 A | | 6/1998 | Wood | |
| 6,010,090 A | | 1/2000 | Bushmaker et al. | |
| 6,368,689 B1 | | 4/2002 | Connor Sledge et al. | |
| 6,425,547 B1 | | 7/2002 | Singh | |

(Continued)

FOREIGN PATENT DOCUMENTS

EP 1 193 205 A2 4/2002

(Continued)

OTHER PUBLICATIONS

Patent Cooperation Treaty Search Report from the International Search Authority, International Application No. PCT/IB2008/054289 dated Mar. 23, 2009.

(Continued)

*Primary Examiner* — Brent O'Hern
(74) *Attorney, Agent, or Firm* — Michael J. Sullivan

(57) ABSTRACT

A roll of a sheet material is provided with elongated sheets within the roll that are either completely detached from each other, or substantially completely detached from each other, such that the user can dispense the elongated sheets with one hand. In the case of toilet paper, the elongated sheets have a pre-determined length deemed to be suitable for most users and serve to assist young children in dispensing a proper amount of tissue from the roll.

7 Claims, 6 Drawing Sheets

U.S. PATENT DOCUMENTS

| | | | |
|---|---|---|---|
| 6,536,624 | B2 | 3/2003 | Johnson et al. |
| 6,991,840 | B2 | 1/2006 | Sosalla |
| 2002/0121172 | A1 | 9/2002 | Lanvin et al. |
| 2003/0132549 | A1 | 7/2003 | Mlinar et al. |
| 2005/0236504 | A1 | 10/2005 | Frenkil |
| 2007/0125902 | A1 | 6/2007 | Alalu et al. |

FOREIGN PATENT DOCUMENTS

| | | | |
|---|---|---|---|
| JP | 2002-046904 | A | 2/2002 |
| KR | 20-0351813 | Y1 | 5/2004 |
| WO | WO 97/23398 | A1 | 7/1997 |

OTHER PUBLICATIONS

TAPPI Official Test Method T 402 om-93, "Standard Conditioning and Testing Atmospheres for Paper, Board, Pulp Handsheets, and Related Products," published by the TAPPI Press, Atlanta, Georgia, revised 1993, pp. 1-3.

TAPPI Official Test Method T 411 om-89, "Thickness (Caliper) of Paper, Paperboard, and Combined Board," published by the TAPPI Press, Atlanta, Georgia, revised 1989, pp. 1-3.

* cited by examiner

ROLLS OF MATERIAL PROVIDING ONE-HANDED DISPENSING OF SHEETS OF PRE-DETERMINED LENGTH

This application is a divisional of U.S. application Ser. No. 12/001,966 filed on Dec. 13, 2007 now abandoned. The entirety of application Ser. No. 12/001,966 is hereby incorporated by reference.

BACKGROUND OF THE INVENTION

Rolls of tissue paper, particularly toilet paper, are provided with spaced-apart lines of perforations which divide the wound length of paper into what are called “sheets”. When a consumer uses a roll of toilet paper, he/she pulls out the desired number of “sheets” and tears the paper along the chosen line of perforation. While such rolls offer a great deal of flexibility in terms of the length of tissue being dispensed, they can be inconvenient in that it takes two hands to dispense the tissue—one to hold the roll to keep it from unwinding while the other hand is used to grasp the exposed end of the tissue to pull and tear the tissue along the chosen line of perforation. Also, the perforations do not always function as desired and the tissue frequently tears irregularly. In addition, young children do not always know how much toilet paper to use and frequently dispense much more than is needed, which can be a concern for parents.

Therefore there is a need for a roll of tissue paper which dispenses pre-determined lengths of paper easily and reliably.

SUMMARY OF THE INVENTION

It has now been discovered that rolls of sheet materials, such as rolls of paper or nonwovens, particularly tissue paper, can be provided with spaced-apart lines of severance that are spaced apart along the length of the wound material at a pre-determined length corresponding to a commonly accepted amount, such that the consumer or other user can reliably remove the pre-determined length of material by unwinding the roll with one hand. For toilet paper in particular, this capability is not only convenient for adults, but also enables children to consistently remove an acceptable amount of toilet paper, and no more, each time they pull out tissue from the roll.

Hence in one aspect, the invention resides in a roll of a sheet material comprising a plurality of elongated sheets having a pre-determined length between opposite ends, said elongated sheets being positioned end-to-end within the roll and separated from each other by a line of detachment having a minimal attachment length of from about 1 to about 20 percent of the roll width, said elongated sheets containing one or more transverse lines of perforation between the ends.

In another aspect, the invention resides in a roll of sheet material comprising a plurality of elongated sheets having a pre-determined length, said elongated sheets being positioned end-to-end within the roll and completely detached from each other.

In another aspect, the invention resides in a method of making rolls of a sheet material, such as a roll of tissue paper product, comprising: (a) providing a basesheet having a machine direction and a cross-machine direction; (b) providing the basesheet with multiple spaced-apart lines of partial severance running in the cross-machine direction, said lines of partial severance comprising alternating segments of severance and segments of perforation, each of said segments of severance corresponding to the width of a roll of sheet material product, wherein consecutive segments of severance in the machine direction are spaced-apart a pre-determined distance in the machine direction of the basesheet, said consecutive machine direction segments of severance being separated by at least one segment of perforation; (c) winding the basesheet into a log having a machine direction length of basesheet which corresponds to the length of a roll of the sheet material product; (d) severing the basesheet in the cross-machine direction and adhering the resulting free end of the basesheet to the log; and (e) slitting the log into individual rolls of the sheet material.

As used herein, a “sheet material” can be any sheet material that can suitably be wound into a roll intended to dispense the sheet material in finite lengths. Suitable sheet materials include nonwoven materials, such as meltblown or coform sheets suitable for use as wipes, towels, sterile wrap and the like, and paper materials, such as tissue paper suitable for use as facial tissue, paper towels, toilet paper and the like. Such tissue papers can be characterized by having a relatively low density as evidenced by having a sheet bulk of about 3 cubic centimeters or greater per gram, more specifically about 10 cubic centimeters or greater per gram, and still more specifically from about 10 to about 30 cubic centimeters per gram. Sheet bulk can be determined by the quotient of the “sheet caliper” (defined below), expressed in microns, divided by the dry basis weight, expressed in grams per square meter. The resulting sheet bulk is expressed in cubic centimeters per gram. More specifically, the sheet caliper is the representative thickness of a single tissue sheet measured in accordance with TAPPI test methods T402 “Standard Conditioning and Testing Atmosphere For Paper, Board, Pulp Handsheets and Related Products” and T411 om-89 “Thickness (caliper) of Paper, Paperboard, and Combined Board” with Note 3 for stacked sheets. The micrometer used for carrying out T411 om-89 is an Emveco 200-A Tissue Caliper Tester available from Emveco, Inc., Newberg, Oreg. The micrometer has a load of 2 kilo-Pascals, a pressure foot area of 2500 square millimeters, a pressure foot diameter of 56.42 millimeters, a dwell time of 3 seconds and a lowering rate of 0.8 millimeters per second.

A “basesheet” is a sheet of material produced and wound into a parent roll during the sheet material manufacturing process. The basesheet is unwound and thereafter converted into final products, such as by perforating, rewinding and slitting. In the context of tissue manufacturing, basesheets are about as wide as the tissue machine, which is typically about 10 feet or more.

A “sheet” is an amount of tissue in a rolled tissue product, bounded by lines of perforation as is commonly understood in the tissue industry. Such sheets are typically approximately square, measuring about 4-5 inches (about 10-13 centimeters) on each side for toilet paper and about 10-11 inches (about 25-28 centimeters) on each side for paper towels.

An “elongated sheet” is an amount of sheet material in accordance with this invention having a “pre-determined length” (described below). Advantageously, the pre-determined length can be longer than the circumference of the roll of sheet material. More specifically, the pre-determined length can be longer than the initial circumference of the roll of product prior to first use. For toilet paper, the elongated sheet can have a pre-determined length of about 16 inches (about 40 centimeters) or greater, which corresponds to approximately 4 or more conventional “sheets” of toilet paper.

A “pre-determined length” is a length of material that is established during the manufacturing or converting process by the machine direction spacing between consecutive "segments of severance" as described below and illustrated in FIGS. 4-6.

A "line of detachment" is a term that applies to the final roll product form and is a transverse line that provides only a minimal amount of attachment, or no attachment at all, between consecutive (adjacent) elongated sheets within a roll of product such that elongated sheets can be dispensed using one hand. Lines of detachment in the final product correspond to "segments of severance" in a basesheet that are created during converting operations (described below). As previously mentioned, a feature of this invention is the fact that the consumer can remove one individual elongated sheet at a time merely by removing the next available elongated sheet from the roll with one hand. While adjacent elongated sheets can be completely severed and detached from each other, it is within the scope of this invention that the adjacent sheets can be minimally attached to each other along their common ends (lines of detachment) if desired for manufacturing or other purposes, such as to maintain suitable machine direction tensile strength during transport and winding of the basesheet. However, any such minimal attachment does not prevent the consumer from separately removing adjacent elongated sheets from the roll by the act of merely unwinding the roll with one hand. Quantitatively, such minimal attachment can be provided by a "minimal attachment length", which is the portion of the line of detachment where the adjacent elongated sheets are not completely severed from each other. Depending upon the tensile strength of the material and how abruptly the user normally removes the elongated sheet during dispensing, the minimal attachment length can be from about 1 to about 20 percent of the total width of the elongated sheet or product roll (elongated sheet width and product roll width are the same), more specifically from about 1 to about 15 percent, more specifically from about 1 to about 10 percent, and still more specifically from about 1 about 5 percent. For toilet paper, which has a roll width of about 10 centimeters, the minimal attachment length can be from about 1 millimeter to about 2 centimeters. The minimal attachment can be achieved by positioning one or more attachment points anywhere along the end of an elongated sheet, provided the sum total of the lengths of each attachment point does not exceed the minimal attachment length. It can be advantageous to provide a single minimal attachment point about midway between the edges of the product roll, or one minimal attachment point at each opposite edge of the roll, or one minimal attachment point on alternating opposite edges of the roll.

A "line of partial severance" is a term that applies to the basesheet (as opposed to an elongated sheet within a roll of product) and is a cross-machine direction line in the basesheet having alternating "segments of severance" and "segments of perforation". The segments of severance and segments of perforation may be equal or unequal in length. These terms will be more fully described in connection with the description of FIGS. 4-6, but in general, each "segment of severance" creates a line of detachment that will ultimately be separating consecutive elongated sheets in a roll of product. The length of the segments of severance, taken as a whole, can be equal or about equal to the width of the final roll of product. If it is desired to have a product in which consecutive elongated sheets are completely detached from each other, the length of the segments of severance can be made to be slightly longer than the width of the final roll of product which, due to manufacturing tolerances associated with the log slitting operation, ensures that the resulting elongated sheets within the roll of sheet material product are completely detached from each other. However, it can be advantageous that consecutive elongated sheets within a product roll be minimally attached, rather than completely severed, in order to ensure that the next available elongated sheet remains on the product roll until the user wants to remove it. In such cases, the segments of severance will contain a minimal attachment length as described below.

The "segments of perforation" are the portions of a line of partial severance in between the segments of severance spaced apart in the cross-machine direction of the basesheet. Because these segments of perforation still have a significant amount of attachment, they serve to maintain the integrity of the basesheet during converting operations by providing sufficient tensile strength to keep the basesheet from tearing or distorting. At the same time, they provide optional points within an elongated sheet for the user to tear the elongated sheet. In addition, one or more complete lines of perforation can be provided in the basesheet between and parallel to the lines of partial severance to ultimately provide additional optional points within an elongated sheet for the user to tear the elongated sheet. The structure of the segments of perforation and lines of perforation are well known in the art. They contain very short alternating lengths of attachment and detachment. Typically the lengths of attachment and detachment are about equal in length, which can typically be about 1-2 millimeters.

As used herein, "positioned end-to-end" means that adjacent or consecutive elongated sheets within a roll of product abut each other along their common edges and do not overlap each other.

The pre-determined length of the individual elongated sheets can be any length desired for the particular product application. More specifically, the pre-determined length can suitably be about 40 centimeters or greater, more specifically from about 40 to about 100 centimeters, more specifically from about 40 to about 90 centimeters, more specifically from about 40 to about 80 centimeters, and still more specifically from about 45 to about 80 centimeters. The minimum and maximum lengths are determined by the nature of the sheet material product and the needs and preferences of the user. However, if the individual elongated sheets are completely detached from each other, it is desirable that the length of the individual elongated sheets be at least as long as the circumference of the product roll in order to prevent the possibility of the outermost elongated sheet unintentionally falling off of the roll. However, if shorter sheets are desired, or if larger rolls having a circumference greater than about 40 centimeters are desired, minimal attachment can be provided between adjacent sheets as discussed above in order to prevent such occurrences. For toilet paper, a pre-determined length corresponding to about 4-8 conventional sheets of toilet paper has been found to be advantageous.

The individual elongated sheets can be uninterrupted by transverse cross-machine directional lines of perforation or, optionally, can be provided with one or more transverse or cross-machine directional lines of perforation, as are provided in conventional rolls of tissue products. This option can provide some flexibility to the user if the desired amount of sheet material is different than the amount provided by the pre-determined elongated sheet lengths. The number of optional transverse lines of perforation can be from 1 to 8 or more depending upon the product. For example, a pre-determined elongated tissue sheet length of about 40 centimeters corresponds to about 4 standard perforated sheets of toilet paper. Such elongated sheets can be provided with one, two or three spaced-apart transverse lines of perforation to provide the further ability to detach one, two, three or four smallersized sheets if desired. If a longer elongated sheet is desired, such as one corresponding to 8 conventional sheets of toilet paper, such elongated sheets can be provided with up to seven optional lines of perforation.

BRIEF DESCRIPTION OF THE DRAWING

The following figures will be described particularly in connection with producing rolls of bath tissue, but the teachings are applicable to any sheet material product as described above.

DETAILED DESCRIPTION OF THE DRAWINGS

Figure 1:
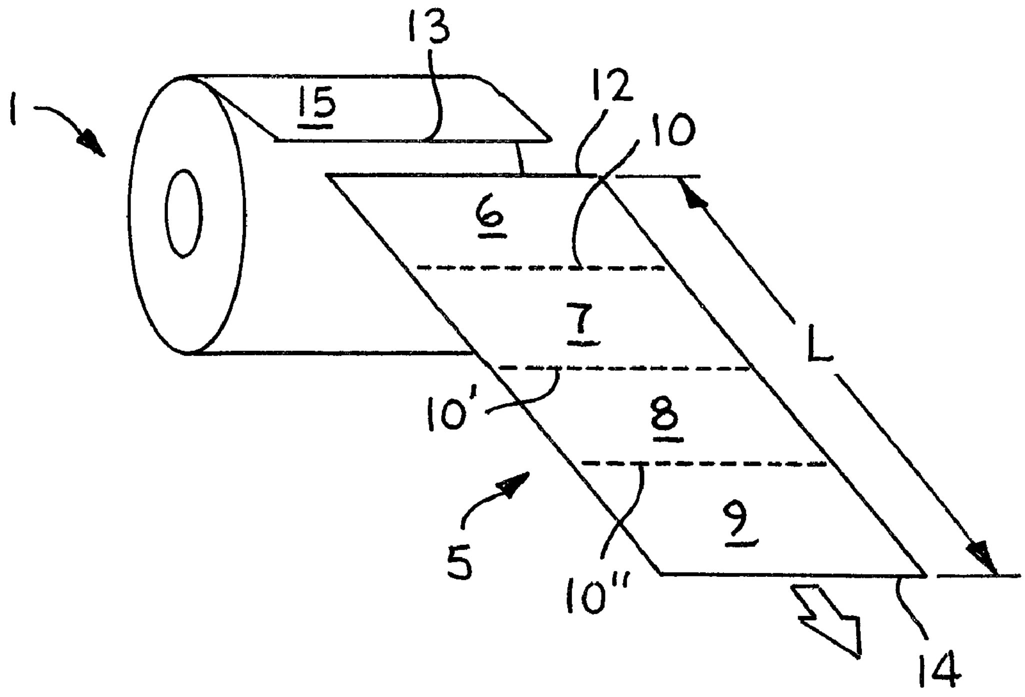
FIG. 1 is a schematic illustration of a roll of tissue product in accordance with this invention, illustrating the removal of an individual elongated sheet of a pre-determined length.

Referring to FIG. 1, the invention will be described in greater detail. For purposes herein, like reference numbers in the various figures refer to like features.

Shown in FIG. 1 is a roll of toilet paper product in accordance with this invention being unwound in the direction of the arrow 2. A detached elongated sheet 5 has a pre-determined length "L" as measured between two ends 12 and 14, which correspond to lines of detachment (and segments of severance in the basesheet). In the embodiment shown, the elongated sheet is subdivided into four "sheets" 6, 7, 8 and 9 by lines of perforation 10, 10' and 10". The elongated sheet 5 can be used "as is", or it can be subdivided by the consumer if desired. Based on consumer research, for toilet paper Applicants' consider an elongated sheet having a length "L" that is the equivalent of four conventional "sheets" to be optimal. However, as previously discussed, the length "L" can be any length deemed suitable for the product and users in the relevant market. As previously mentioned, "L" can be about 40 centimeters or greater, more particularly from about 40 to about 100 centimeters, depending on the user preferences and the particular product form (such as toilet paper or paper towels). When on the roll, the end 12 of elongated sheet 5 abuts the end 13 of the adjacent elongated sheet 15.

Figure 2:
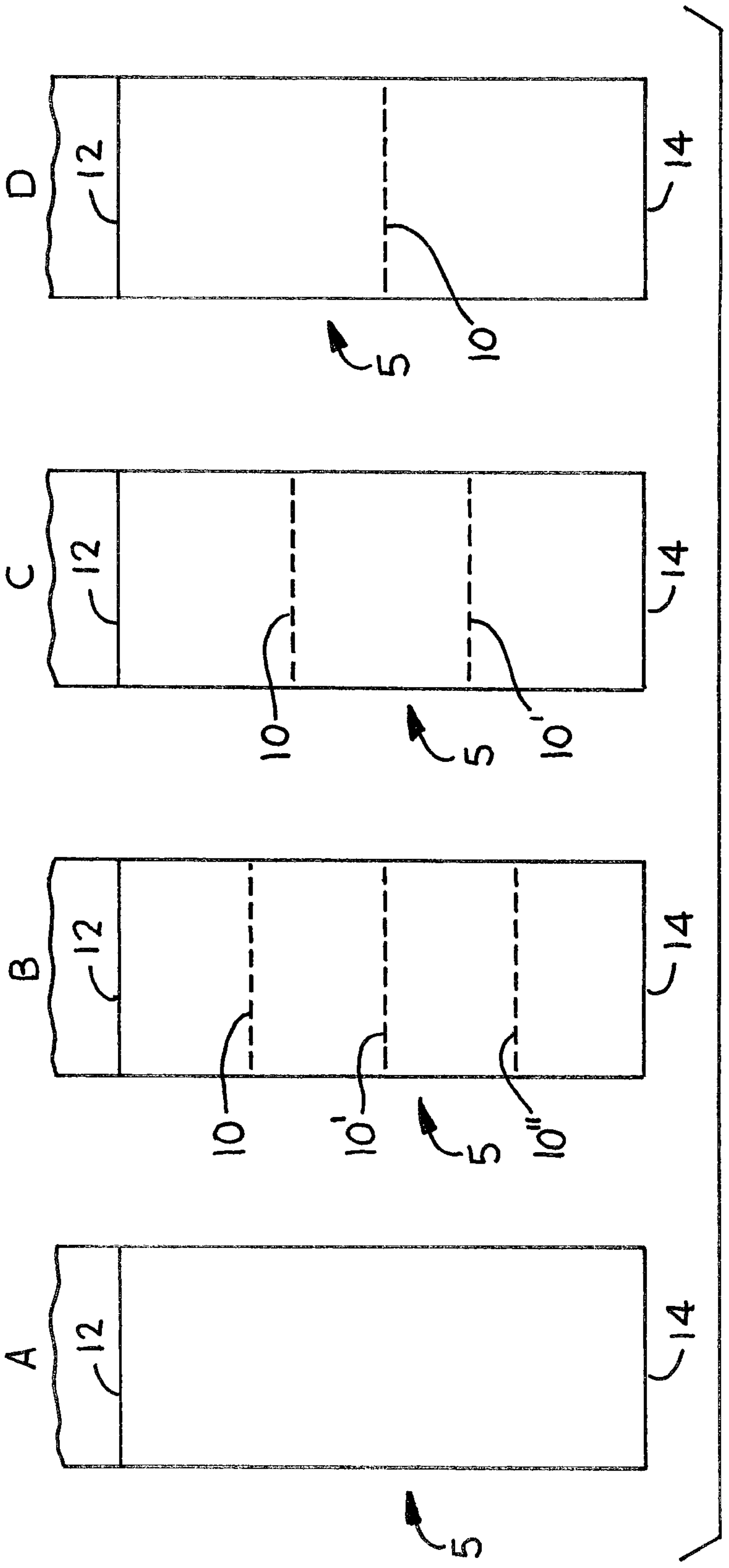
FIGS. 2A-2D are schematic illustrations of a representative length of toilet paper from a roll of toilet paper in accordance with this invention, illustrating the presence of no optional lines of perforation, one optional line of perforation, two optional lines of perforation and three optional lines of perforation.

FIG. 2 illustrates various optional configurations of an elongated sheet 5 just prior to being dispensed from a roll of tissue product. FIG. 2A illustrates an elongated sheet having no lines of perforation between the ends 12 and 14. FIG. 2B illustrates the embodiment shown in FIG. 1, which has three optional lines of perforation 10, 10' and 10". FIG. 2C illustrates an embodiment having two lines of perforation 10 and 10'. FIG. 2D illustrates an embodiment having one line of perforation 10 between the ends 12 and 14 of the elongated sheet. Of course, if the length of the elongated sheet is chosen to be longer than four conventional "sheets", more than three optional lines of perforation can be provided. Specifically, the number of additional optional lines of perforation within an elongated sheet can be four, five, six or seven, the latter case being an elongated sheet having a length equivalent to eight conventional sheets. In all cases, the spacing between the optional lines of perforation can be equal or unequal.

Figure 3:
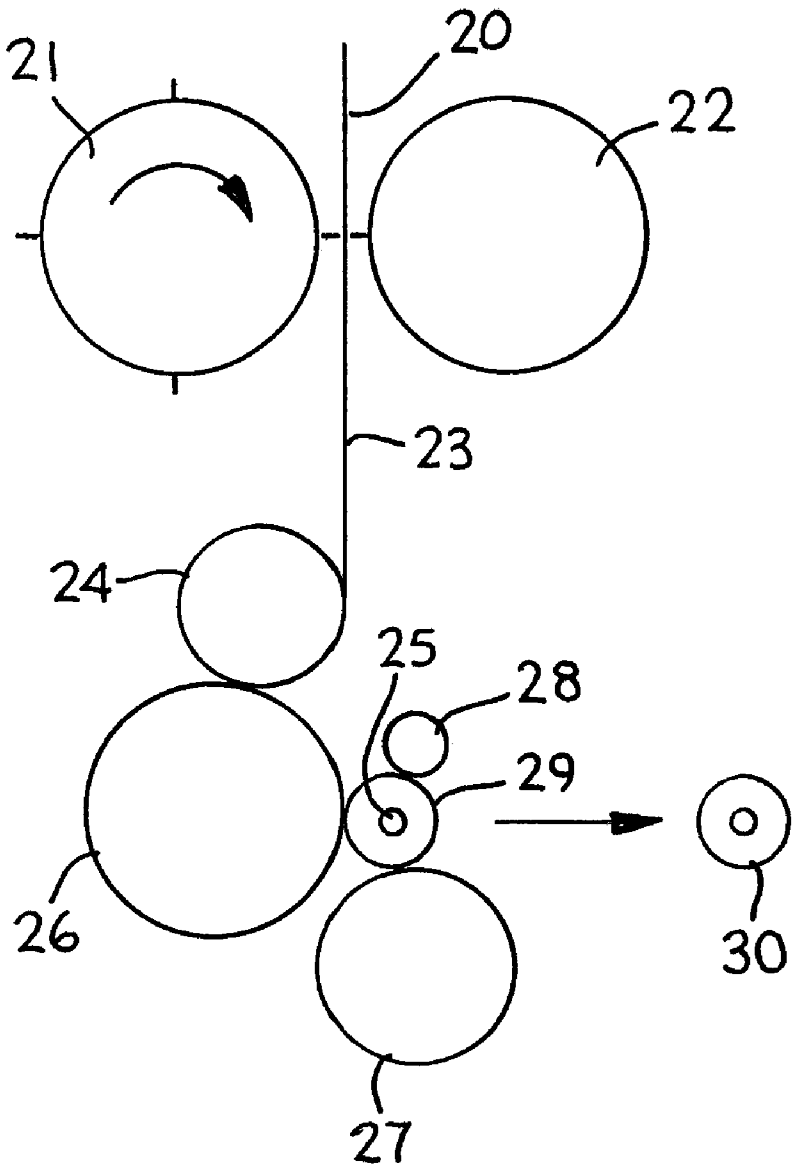
FIG. 3 is a schematic illustration of the converting process in which a tissue basesheet from a parent roll is provided with lines of partial severance and, optionally, lines of perforation, wound into logs, and thereafter sliced into individual rolls of tissue product, such as toilet paper or paper towels.

FIG. 3 schematically illustrates the converting process for producing product rolls in accordance with this invention. Shown is a tissue basesheet 20 being fed into a nip between a perforator roll 21 and a stationary anvil roll 22. The spacing of the perforating blades around the circumference of the perforator roll 21 will determine the machine direction spacing between the lines of partial severance and any optional lines of perforation. The perforator roll and stationary anvil roll shown can produce the basesheet illustrated in FIG. 4. If additional lines of perforation between the lines of severance are needed, the number of blades on the perforator roll can correspondingly be increased. Alternatively, an additional pair of a perforator roll and an anvil roll can be used if more lines are desired that cannot conveniently be provided by a single pair.

After the basesheet has been provided with the desired lines of partial severance and optional lines of perforation, the basesheet 23 is passed around detour roll 24 and wound onto a core 25, assisted by upper winding drum 26, lower winding drum 27 and rider roll 28, to produce a log 29. Once the desired sheet count on the log is reached, the log diameter being the same as the diameter of the final product, the basesheet is severed and the resulting loose end of the basesheet is tail-tacked (adhered) to the log in a conventional manner. The completed log 30 is then cut or sliced into multiple rolls of tissue product.

Figure 4:
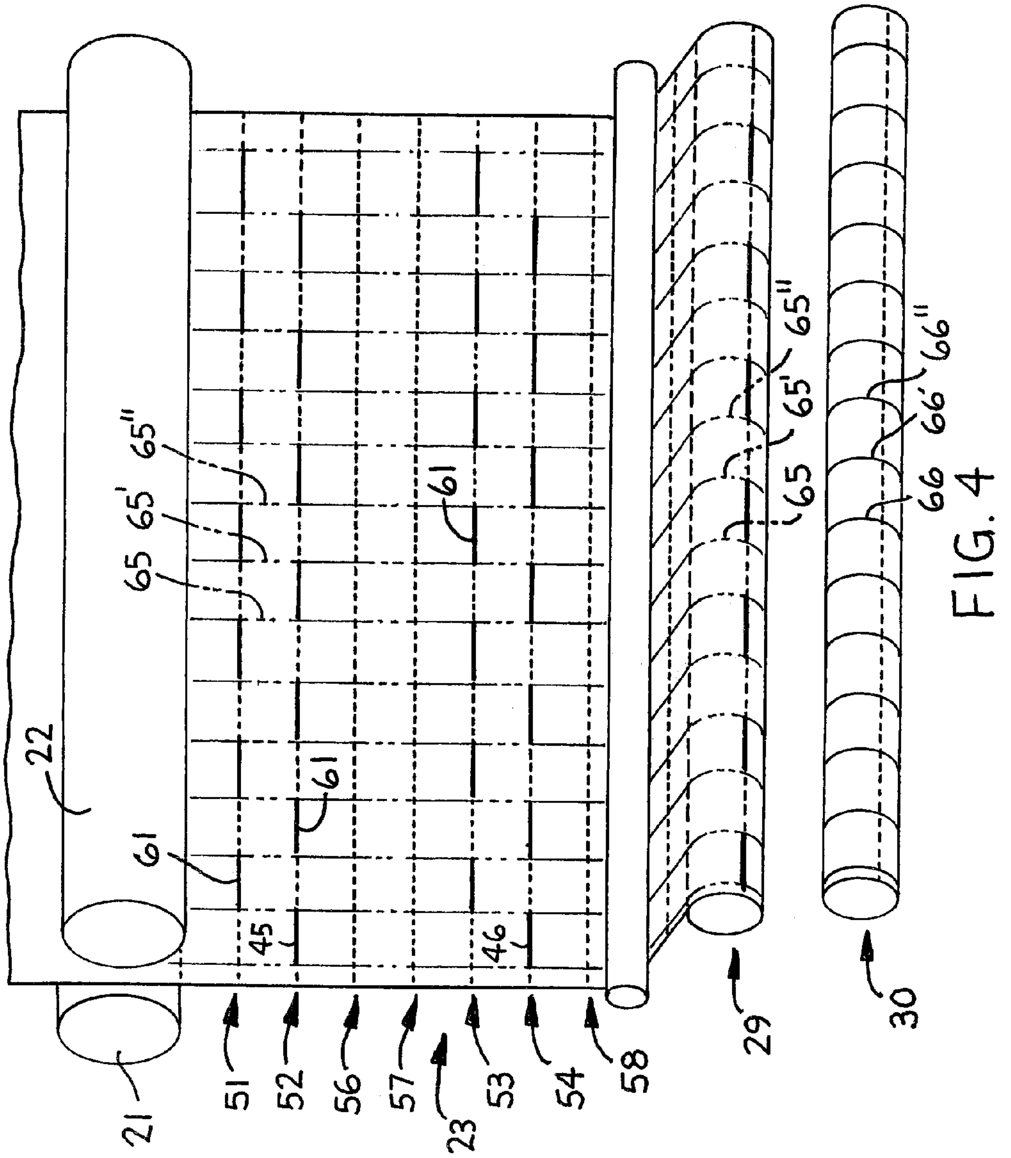
FIG. 4 is a schematic illustration of a basesheet during converting operations, illustrating one possible arrangement of the spaced-apart lines of partial severance and optional lines of perforation.

FIG. 4 is a schematic plan view of the process illustrated in FIG. 3, particularly illustrating the lines of partial severance imparted to the basesheet in accordance with this invention. As shown, the basesheet 23 is provided, in the machine direction, with four parallel cross-machine direction lines of partial severance 51, 52, 53 and 54. Also, the basesheet 23 has been provided with optional conventional lines of perforation 56, 57 and 58, designated by dashed lines. For purposes of illustration, the solid lines, such as 61, show segments of severance which are equal to the full width of the ultimate product roll. The cross-machine directional lengths between the segments of severance, which in this embodiment are lines of perforation, are referred to herein as segments of perforation. The machine direction parallel phantom lines, such as 65, 65' and 65", which are spaced apart in the cross-machine direction across the entire basesheet, represent imaginary lines where the basesheet will ultimately be cut or sliced into individual product rolls. The corresponding cuts or slices are represented by 66, 66' and 66" in the log 30.

As shown in this embodiment, the machine direction spacing of the segments of severance is the equivalent of four conventional "sheets". This means that the final product roll will have elongated sheets having a length of about 40 centimeters. In this embodiment, the consecutive machine direction segments of severance are separated by one line of partial severance and two lines of perforation. For example, consecutive machine direction segments of severance 45 and 46 are separated by line of partial severance 53 and two lines of perforation 56 and 57. A feature of this invention is that the segments of severance are spaced apart from each other in the cross-machine direction of the basesheet, which enables the basesheet to retain sufficient strength and dimensional stability to pass through the converting process. The final product produced by this embodiment is as shown in FIG. 1.

Figure 5:
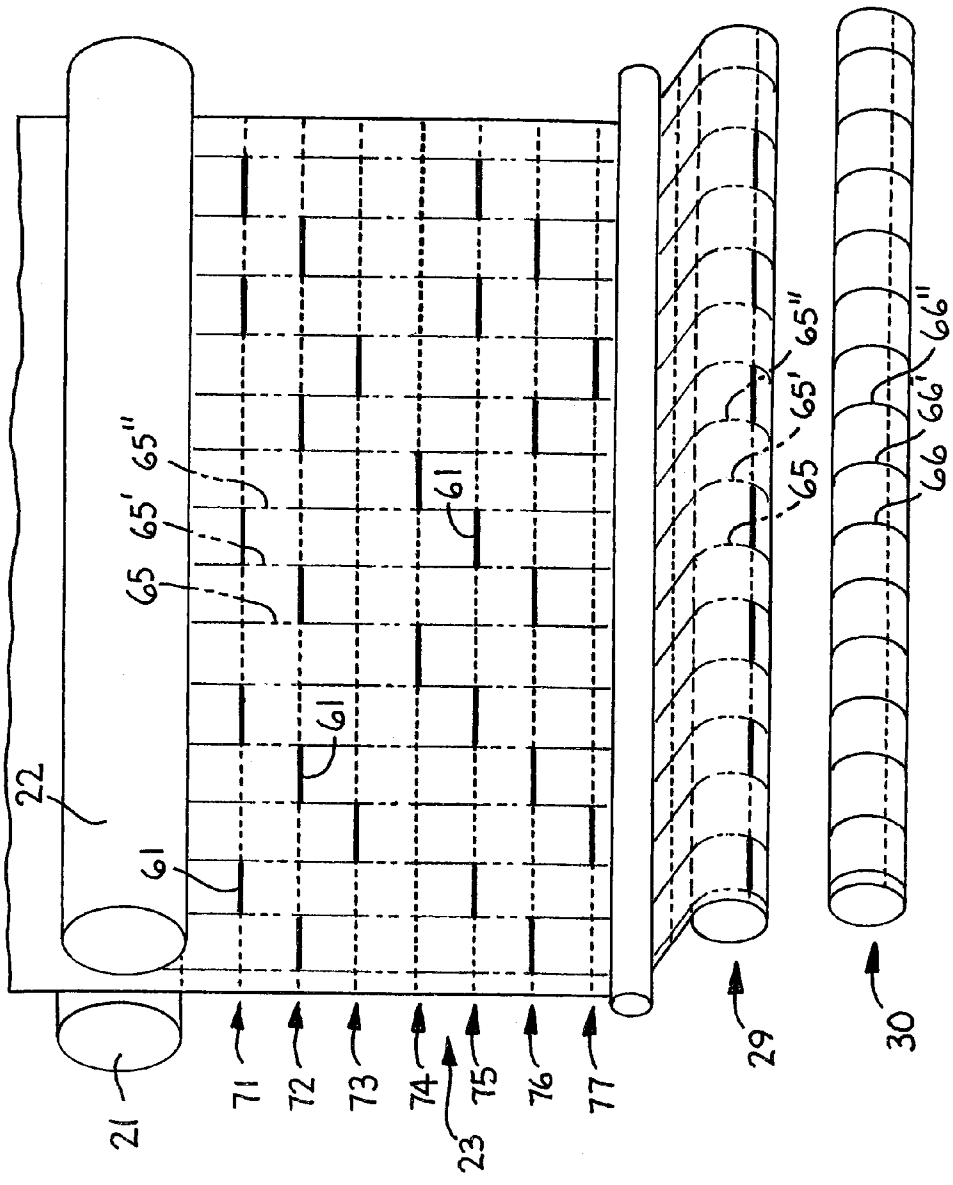
FIG. 5 is a schematic illustration of a basesheet during converting operations, similar to FIG. 4, illustrating another possible arrangement of the spaced-apart lines of partial severance.
Figure 6:
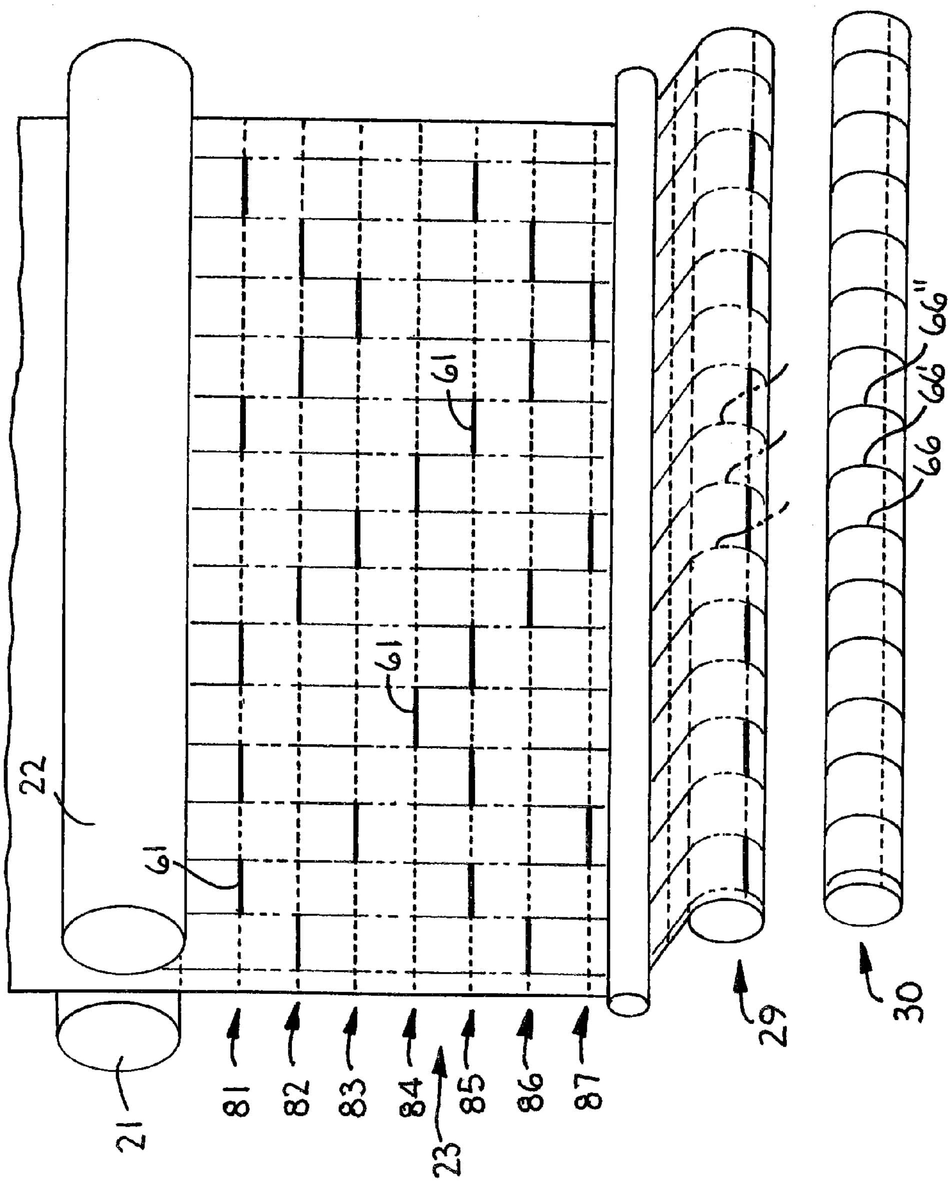
FIG. 6 is a schematic illustration of a basesheet during converting operations, similar to FIGS. 4 and 5, illustrating another possible arrangement of the spaced-apart lines of partial severance.

FIGS. 5 and 6 are similar to FIG. 4, but simply illustrating different arrangements of the lines of partial severance and different relative positioning of the segments of severance within each line of partial severance. In particular, in FIG. 5, the lines of partial severance are shown as 71, 72, 73, 74, 75, 76 and 77. Each such line of partial severance consists of alternating segments of severance and segments of perforation of varying lengths. Similarly, in FIG. 6, the lines of partial severance are designated by reference numbers 81, 82, 83, 84, 85, 86 and 87. In each embodiment, the consecutive machine direction segments of severance are separated by three segments of perforation. The ultimate product produced by the alternative converting embodiments of FIGS. 4, 5 and 6 is the same as the embodiment illustrated in FIG. 1. It will be appreciated that many different configurations of the lines of partial severance can be utilized, including optional lines of perforation, depending upon the lengths of the elongated sheets and the desired number of optional lines of perforation in the final product.

In the interests of brevity and conciseness, any ranges of values set forth in this specification are to be construed as written description support for claims reciting any sub-ranges having endpoints which are whole number values within the specified range in question. By way of a hypothetical illustrative example, a disclosure in this specification of a range of from 1 to 5 shall be considered to support claims to any of the following sub-ranges: 1-4; 1-3; 1-2; 2-5; 2-4; 2-3; 3-5; 3-4; and 4-5.

It will be appreciated that the foregoing description, given for purposes of illustration, is not to be construed as limiting the scope of this invention, which is defined by the following claims and all equivalents thereto.

We claim:

1. A roll of tissue sheets comprising a plurality of elongated tissue sheets having a pre-determined length, said elongated tissue sheets abutting one another within the roll and completely detached from each other.

2. The roll of claim 1 wherein the elongated tissue sheets contain one or more transverse lines of perforation.

3. The roll of claim 1 wherein the elongated tissue sheets contain two transverse lines of perforation.

4. The roll of claim 1 wherein the elongated tissue sheets contain three transverse lines of perforation.

5. The roll of claim 1 wherein the pre-determined length is from about 40 to about 100 centimeters.

6. The roll of claim 1 wherein the pre-determined length is from about 40 to about 80 centimeters.

7. The roll of claim 1 wherein the pre-determined length is greater than the circumference of the roll.

* * * * *